United States Patent [19]

Nimura et al.

[11] 4,456,695

[45] Jun. 26, 1984

[54] COMPONENT OF CATALYST FOR OLEFIN POLYMERIZATION

[75] Inventors: Hitoshi Nimura; Makoto Kono; Shinichi Yoshida, all of Ibaraki, Japan

[73] Assignee: Mitsubishi Petrochemical Company Limited, Tokyo, Japan

[21] Appl. No.: 409,858

[22] Filed: Aug. 20, 1982

[30] Foreign Application Priority Data

Aug. 20, 1981 [JP] Japan ................ 56-130729

[51] Int. Cl.$^3$ .............................................. C08F 4/64
[52] U.S. Cl. .................................. 502/104; 502/119; 502/118; 502/127; 502/125; 502/126; 526/119
[58] Field of Search ..................... 252/429 B

[56] References Cited

U.S. PATENT DOCUMENTS

| | | | |
|---|---|---|---|
| 4,232,139 | 11/1980 | Minami et al. | 252/429 B X |
| 4,328,121 | 5/1982 | Capshew | 252/429 B |
| 4,329,253 | 5/1982 | Goodall et al. | 252/429 B |
| 4,343,721 | 8/1982 | Goodall et al. | 252/429 B |

FOREIGN PATENT DOCUMENTS 54-40293  3/1979  Japan .
2052534A  1/1981  United Kingdom .

*Primary Examiner*—Patrick Garvin

*Attorney, Agent, or Firm*—Oblon, Fisher, Spivak, McClelland & Maier

[57] ABSTRACT

A novel component of a catalyst for polymerization of olefins, which is highly active, exhibits high stereoregularity and also provides polymers of very uniform particle sizes. The catalyst component is a contact product of the following component A and component B:

Component A

A solid product obtained by mixing a solution of the following components (1) and (2) and 0.05 to 5 moles of a titanium tetrachloride precipitant per mol of the component (1) in the copresence of the following component (3), thereby to produce a solid product and then washing the solid product to remove a soluble titanium component; (1) a magnesium compound represented by the formula $Mg(OR^1)_{2-n}X_n$, wherein $R^1$ is a hydrocarbyl having 1 to 12 carbon atoms, which is an alkyl, an aryl, an aralkyl or a cycloalkyl, or a halo-derivative thereof, X is a halogen, and n is a number satisfying $0<n\leq 2$; (2) a titanium compound represented by the formula $Ti(OR^2)_4$ or a polymer thereof, wherein $R^2$ is a hydrocarbyl having 1 to 12 carbon atoms, which is an alkyl, an aryl, an aralkyl or a cycloalkyl or a halo-derivative thereof; (3) an electron-donor compound;

Component B (4) titanium tetrachloride.

10 Claims, No Drawings

COMPONENT OF CATALYST FOR OLEFIN POLYMERIZATION

BACKGROUND OF THE INVENTION

1. Field of the Art

This invention relates to a component of a socalled Ziegler or Ziegler-Natta catalyst for polymerization of olefins.

The catalyst of the present invention is highly active, exhibits very high stereoregularity in the case of production of stereoregular polyolefins, and also provides polymer powder having very uniform distribution of particle sizes.

2. The Prior Art

A variety of the methods for preparation of solid catalyst components wherein magnesium, titanium, a halogen and an electron donor are used as essential components thereof have been proposed. It is also reported that these catalyst components possess generally high polymerization activity and exhibit high stereoregularity in the case of polymerization of an α-olefin having 3 or more carbon atoms. In these catalyst components, ground or milled magnesium halides are often used as carriers. In these cases, the resulting olefin polymer powder exhibits a broad distribution of particle sizes and comprises a very large proportion of fine powder of about 100 microns or less. Thus, industrial use of such catalyst components are greatly restricted with respect to removal and transportation of polymers and operations of copolymerization in the case of slurry polymerization, or stabilization of flowing states and recovery of polymer powder and the like in the case of gas phase polymerization.

It has also been reported that, to obtain carriers of uniform particle size containing magnesium compounds, a solution of an organomagnesium compound or a solution of a magnesium halide in an electron donor is used as the starting material, and a solid product for the carrier is separated out therefrom. These methods, however, are disadvantageous in that a costly material is required or a special treatment is needed to prevent the solvent electron donor from remaining in the solid catalyst component and producing a harmful action.

Furthermore, a method for obtaining a solid catalyst component for polymerization of olefins has been proposed in Japanese Patent Laid-Open Publication No. 40293/1979. This method utilizes the property of Ti(OR$^2$)$_4$ of being capable of dissolving Mg(OR$^1$)$_{2-n}$X$_n$ and an electron donor (wherein R$^1$ and R$^2$ are an alkyl having 1 to 10 carbon atoms, an aryl or a cycloalkyl, X is a halogen and n is a number defined by $0<n\leq2$) and comprises an optional step of separating out a solid product from the solution by cooling it or adding thereto a precipitant and a step of contacting the solution or the separated solid with a liquid titanium halide compound. According to this method, there is provided a process for preparation of a catalyst component at a low cost having a very high activity especially for polymerization of ethylene, without using costly starting material or a harmful electron donor. However, most of these catalysts are useful only as catalysts for production of polyethylene and are not always satisfactory with respect to polymerization activity and stereoregularity in the case of polymerization of an α-olefin having 3 or more carbon atoms.

SUMMARY OF THE INVENTION

It is an object of the present invention to solve the above described problems, which object can be attained by using a titanium tetraalkoxide as a solvent for the Mg compound and using a smallest amount possible of titanium tetrachloride as a separating agent as well as by separating the resulting solid component from a solution component still containing a soluble titanium component, washing it amply and then treating it again with titanium tetrachloride. In the conventional methods, the titanium alkoxide compound is brought excessively into the deposited solid. This may sometimes be preferred in the case of polymerization of ethylene. We have found, however, that such "contamination" is a great obstacle to the production of poly-α-olefins wherein stereoregularity is an important factor. Therefore, the above mentioned procedure is considered to be indispensable for obtaining an excellent catalyst wherein the contamination is controlled to a suitable degree.

Accordingly, the component of the present invention of a catalyst for polymerization of olefins is characterized in that it is a contact product of the following component A and component B.

Component A

A solid product obtained by mixing a solution of the following components (1) and (2) and 0.05 to 5 mols of a titanium tetrachloride precipitant per mol of the component (1) in the copresence of the following component (3) thereby to produce a solid product and washing the solid product to remove a soluble titanium component, the components (1), (2) and (3) being: (1) a magnesium compound represented by the formula Mg(OR$^1$)$_{2-n}$X$_n$, wherein R$^1$ is a hydrocarbyl having 1 to 12 carbon atoms selected from an alkyl, an aryl, an aralkyl and a cycloalkyl, or a halo-derivative thereof, X is a halogen, and n is a number satisfying $0<n\leq2$; (2) a titanium compound represented by the general formula Ti(OR$^2$)$_4$ or a polymer thereof, wherein R$^2$ is a hydrocarbyl having 1 to 12 carbon atoms selected from an alkyl, an aryl, an aralkyl and a cycloalkyl or a halo-derivative thereof, which may be the same as or different from those of R$^1$; (3) an electron-donor compound;

Component B (4) titanium tetrachloride.

In accordance with the present invention, a solid catalyst component providing the catalyst produced therefrom with high activity in the polymerization of ethylene as well as high activity and also stereoregularity in the polymerization of an α-olefin having 3 or more carbon atoms is obtained by restricting the titanium tetrachloride used as the precipitant to a small quantity, separating the deposited solid from a soluble titanium component, and treating it again with titanium tetrachloride.

Moreover, the peculiar properties of the solid component obtained by the deposition in the method of the present invention has been made clear, and it has also been confirmed that the particle size distribution of the olefin polymer produced thereby is very uniform.

The reason why such effects can be obtained by using a small amount of the precipitant and separating and washing the deposited solid component has not yet been made clear. It is considered, however, that if the amount of the titanium tetrachloride precipitant is decreased, formation of an undesired solid component as the solid catalyst component for stereoregular polymerization of α-olefins may be reduced, which undesired solid component may be different from the intended solid component and is presumed to be Ti(OR$^2$)$_3$Cl and which would be produced by an unnecessary reaction between the precipitant in an excess amount and a titanium alkoxide compound [component (2)] that acts as a solvent. As to the effects attained by the separation and washing, it is presumed that, even after the deposition treatment, a considerable amount of one or more members of the components (1), (2) and (3) is contained in the solution from which the solid product has deposited, and, by contacting titanium tetrachloride immediately with the solution without the separation and the washing, a solid product having a different composition (perhaps containing different titanium species) is separated out, which solid product has an adverse effect on the stereoregular polymerization of α-olefins having 3 or more carbon atoms.

DETAILED DESCRIPTION OF THE INVENTION

The catalyst component of the present invention is composed of a contact product of the following component A and component B.

1. Component A

The component A is a product which has been separated out from a homogeneous mixture of the following components (1), (2) and (3) namely a solution. The separation is conducted by addition of titanium tetrachloride used as a precipitant. The resulting deposit is washed to remove a soluble titanium component according to the present invention.

(1) Component (1)

This component is a magnesium compound represented by the formula Mg(OR$^1$)$_{2-n}$X$_n$, wherein R$^1$ is a hydrocarbyl having 1 to 12, preferably 3 to 8, carbon atoms, which is an alkyl; an aryl, preferably phenyl, tolyl or xylyl; a cycloalkyl, preferably cyclohexyl; an aralkyl, preferably benzyl, trimethyl, xylylmethyl or phenylethyl; or a halo-derivative thereof wherein 1 to 3 residual hydrogens have been substituted by a halogen, preferably chlorine. X is a halogen, preferably chlorine; and n is a number satisfying $0 < n \leq 2$ (which is not always an integer in the case of a mixture).

Examples of such magnesium compounds are magnesium dihalides such as MgCl$_2$, MgBr$_2$ and MgI$_2$, and halohydrocarbyloxy magnesiums such as Mg(OC$_2$H$_5$)Cl, Mg(OC$_6$H$_5$)Cl, Mg(OC$_8$H$_{17}$)Cl, Mg(OCH$_2$C$_6$H$_5$)Cl, Mg(OC$_3$H$_6$Cl)Cl, and Mg(OC$_3$H$_5$Cl$_2$)Cl. Mixtures of these compounds can also be used. Mixtures of compounds such as a mixture of MgCl$_2$ and Mg(OC$_2$H$_5$)$_2$ are included in the "magnesium compound" [component (1)] of the formula Mg(OR$^1$)$_{2-n}$X$_n$.

(2) Component (2)

This component is a titanium compound represented by the general formula Ti(OR$^2$)$_4$ or a polymer thereof, wherein R$^2$ is a hydrocarbyl having 1 to 12 carbon atoms, which is an alkyl, an aryl, a cycloalkyl, or an aralkyl or a halo-derivative thereof wherein 1 to 3 residual hydrogens have been substituted by a halogen, which R$^2$ may be the same as or different from those of R$^1$. The preferred groups thereof are the same as those described in the definition of R$^1$.

Examples of such compounds are Ti(O-iC$_3$H$_7$)$_4$, Ti(O-nC$_4$H$_9$)$_4$, Ti(O-iC$_4$H$_9$)$_4$, Ti(O-iC$_8$H$_{17}$)$_4$, Ti(O-CH$_2$C$_6$H$_5$)$_4$, Ti(OC$_3$H$_6$Cl)$_4$, Ti(OC$_3$H$_5$Cl$_2$)$_4$, a polymeric titanium alkoxide represented by (a titanium alkoxide)$_m$ wherein m is a degree of polymerization and is an integer of 1 to 20, and mixtures thereof.

(3) Component (3)

The following compounds are suitable for use as the electron donor of the component (3). Mixtures of the compounds selected within each group or among the groups can also be used.

(a) carboxylic acid esters

Examples of these esters are esters of mono-, di-, tri- or tetra-carboxylic acids having 2 to about 20 total carbon atoms such as methyl acetate, ethyl acetate, octyl acetate, ethyl butyrate, ethyl phenylbutyrate, diethyl succinate and ethyl valerate, and esters of aromatic carboxylic acids such as methyl benzoate, ethyl benzoate, octyl benzoate, ethyl p-toluylate, ethyl p-anisate and diethyl phthalate.

(b) Acid halides

The acid halides include the halides of the carboxylic acids mentioned above (1), such as acetyl chloride, benzoyl chloride, benzoyl bromide, benzoyl iodide and toluyl chloride, and the like.

(c) Ethers

Examples of such ethers are mono-, di-, tri- or tetra-ethers having 2 to about 20 total carbon atoms such as diethyl ether, dibutyl ether, dioctyl ether, tetrahydrofuran, dioxane, trioxane, ethylene glycol dimethyl ether, propylene oxide, and epichlorohydrin.

(4) Preparation of a solution of the components (1), (2) and (3)

The components (1), (2) and (3) can be mixed and stirred (preferably under heating) to obtain a homogeneous solution. The temperature is generally 0° to 200° C., preferably 50° to 150° C. The presence of a non-polar solvent as a diluent in addition to the three components is sometimes effective. Examples of such non-polar solvents are hydrocarbons such as n-hexane, n-heptane, benzene, toluene and cyclohexane and halohydrocarbons such as butyl chloride, 1,2-dichloroethane, carbon tetrachloride and chlorobenzene.

In the case where the component (3) is not present in the solution, it can be mixed with the solution together with a halogenating agent.

The components (1), (2) and (3) may be simply mixed to form the solution. It is also possible to premix and pulverize the components (1) and (3) and then to mix the mixture with the component (2) to form a solution.

(5) Precipitant

The precipitant used in the present invention is titanium tetrachloride.

According to the present invention, the precipitant is used in a quantity as small as 0.05 to 5 mols and preferably 0.1 to 4 mols per mol of the magnesium compound [component (1)]. When the precipitant is used in a greater quantity, unnecessary reactions take place with the conponent (2) to produce undesired solid compounds containing titanium species in a considerable amount. Thus the quantity of titanium tetrachloride to be used is restricted as stated above.

Titanium tetrachloride can be diluted for use with a halide (especially chloride) of an element of the III through VI groups in the periodic table, such as silicon tetrachloride or tin tetrachloride.

(6) Deposition of the solid components

By mixing the solution of the above described components (1), (2) and (3) and the above mentioned precipitant (titanium tetrachloride), the solid components can be separated out from the solution.

In general, it is effective to slowly add one of the two members to the other under stirring and to cause the mixture to separate. Thus, the precipitant may be added dropwise to the solution of the components (1), (2) and (3), or the solution of these components may be added dropwise to the precipitant or a solution thereof.

It is also effective to add both of the members dropwise to a hydrocarbon or halohydrocarbon thereby to effect deposition. It is also possible to add dropwise both the solution of the components (1), (2) and (3) and the solution of the precipitant at the same time to the solvent. Moreover, it is also desirable to add dropwise a solution of the components (1) and (2), the precipitant and the component (3) at the same time into a hydrocarbon or halohydrocarbon. In this case, the component (3) is added dropwise successively or intermittently in such a manner that the concentration of the component (3) is changed with time.

The deposition of the solid components from a liquid mixture consisting of the components (1), (2) and (3) and the precipitant can be conducted generally at a temperature of about $-100°$ to about $+100°$ C. and preferably at about $-50°$ to about $50°$ C.

(7) Separation and washing of the deposited solid component

The deposited solid component is separated from the mixture system by a conventional solid-liquid separation method such as decantation or filtration, followed by washing. It is considered that, by the washing, solution components adhering to the solid are removed.

The solvent to be used in the washing is generally an aprotic organic solvent.

Examples of usable solvents are aliphatic, alicyclic, and aromatic hydrocarbons and the halo-derivatives thereof. Specific examples thereof are hexane, heptane, octane, decane, cyclohexane, benzene, toluene, xylene, dichloromethane, dichloroethane, butyl chloride, chlorobenzene, and dichlorobenzene.

It is also useful for removing a remaining soluble titanium compound to add a very small amount of an organoaluminum compound (the same compound as used in the step 5-1) into the solvent to be used for the washing. The quantity to be used is preferably in the ratio by weight of the order of 0.0001 to 0.1 to the weight of the solid.

It should be mentioned that an organic solvent having an electron-donor atom such as O, N and S is not suitable for the washing.

2. Component B

The component B is titanium tetrachloride, which can be used in a solution or a dispersion in a solvent such as a hydrocarbon or a halohydrocarbon.

3. Contacting of the component A with the component B

The solid catalyst component of the present invention is obtained by contacting the component A with the component B.

The contacting can be conducted generally at a temperature ranging from 0° C. to 200° C. and preferably in the range of 50° to 100° C. The contacting time is ordinarily of the order of 10 minutes to 5 hours. It is also possible to repeat the contacting of the components (A) and (B) and the subsequent washing two, three, or four times, which is also an effective procedure. After the contacting, the resulting solid catalyst component is separated from the system, washed and then used for polymerization of olefins.

4. Quantities of the components to be used

The quantity of each component to be used may be optionally selected (except the precipitant), but it is desirable that the molar ratio of each component be within the following range per part of the component (1) $[Mg(OR^1)_nX_{2-n}]$.

(a) component (2) $[Ti(OR^2)_4]$: 0.1 to 10 parts and preferably 0.2 to 3 parts.

(b) component (3) [electron donor]: 0.01 to 40 parts, preferably 0.1 to 8 parts.

(c) titanium tetrachloride used as the precipitant: 0.05 to 5 parts, preferably 0.1 to 4 parts.

(d) quantity of the component B (titanium tetrachloride) used: 0.1 to 100 parts, preferably 2 to 40 parts.

5. Polymerization of α-olefins

The catalyst component of the present invention can be used together with an organometal compound as a cocatalyst for polymerizing an α-olefin.

(1) Co-catalyst

An organoaluminum compound represented by the general formula $AlR_nX_{3-n}$ is used as the co-catalyst, wherein: R is hydrogen, a hydrocarbyl containing 1 to 20 carbon atoms, especially an alkyl, an aralkyl group or an aryl group; X is a halogen, especially chlorine or bromine; and n is a number satisfying the formula $0 < n \leq 3$ (in the case of a mixture, n is not always represented by an integer). Specific examples of the aluminum compound are (a) trialkylaluminums such as trimethylaluminum, triethylaluminum, triisobutylaluminum and trioctylaluminum, (b) alkylaluminum halides such as diethylaluminum monochloride, diisobutylaluminum monochloride, ethylaluminum sesquichloride and ethylaluminum dichloride. Of these organoaluminum compounds, a trialkylaluminum is especially preferred.

The quantity of the organoaluminium compound to be used is in a ratio by weight of 0.01 to 200, preferably 0.08 to 100, to the weight of the solid catalyst component. This quantity, however, is variable depending on the quantity an electron-donor compound (described below in detail) which is used when necessary.

(2) Electron-donative organic compounds

The electron-donative organic compound to be used is selected from alcohols, ethers, esters, ketones and aldehydes.

Of these compounds organic acid esters are preferred. More preferably, the organic acid ester is an α,β-unsaturated carboxylic (especially a monocarboxylic acid) ester. Such an ester with a monohydric alcohol is especially preferred. The term "α,β-unsaturated" herein used includes ethylenical unsaturation as well as aromatic unsaturation.

Specific examples of such esters are lower alkyl ($C_1$ to $C_{12}$) benzoates such as methyl or ethyl benzoate, lower alkyl (e.g., ethyl) p-toluylates, lower alkyl (e.g., i-propyl) anisates, lower alkyl (e.g., methyl) methacrylates, lower alkyl (e.g., ethyl) acrylates, lower alkyl (e.g., ethyl) cinnamates, and di-lower alkyl (e.g., dimethyl) maleates. Of these esters a lower alkylaromatic carboxylate such as a lower alkyl benzoate or p-toluylate is especially preferred.

(3) Olefins

An olefin which is to be polymerized in the presence of a catalyst system of the present invention is an α-olefin represented by the general formula $R-CH=CH_2$, wherein R is hydrogen or a hydrocarbyl having 1 to 10 carbon atoms which may be unsubstituted or substituted. Examples of such olefins are ethylene, propylene, butene-1, pentene-1, and 4-methyl-penten-1. Ethylene or propylene is preferred, and especially preferred is propylene.

A mixture of such α-olefins can also be used. For example, in the case of polymerization of propylene, propylene can be copolymerized with up to 20% by weight of another α-olefin described above (especially ethylene). The α-olefin can also be copolymerized with a copolymerizable monomer other than the α-olefins described above, such as vinyl acetate or a diolefin.

(4) Polymerization

The catalyst system of the present invention can be used not only in ordinary slurry polymerization but also in a non-solvent liquid or gas-phase polymerization wherein a solvent is not substantially used, in the system of a continuous polymerization, a batch polymerization or a polymerization combined with a prepolymerization step.

In the case of slurry polymerization, as the solvent therefor a saturated aliphatic or aromatic hydrocarbon such as hexane, heptane, cyclohexane and toluene or mixtures thereof can be used. The temperature for the polymerization is of the order of from room temperature to 200° C., preferably 50° to 150° C. Hydrogen can be added to the polymerization system as the molecular weight modifier.

EXAMPLE 1

Preparation of the solid catalyst component

A 300-ml 4-necked flask in which air has been replaced with argon gas is charged with 25 ml of dehydrated industrial grade hepatane, 0.052 mol of $MgCl_2$ [component (1)], 0.11 mol of $Ti(O-nC_4H_9)_4$ [component (2)], and 0.013 mol of ethyl p-toluylate [component (3)], respectively. The mixture is heated to 80° C. with stirring to form a homogeneous solution, which was then cooled to room temperature. To the cooled solution, a solution of 0.11 mol of titanium tetrachloride (precipitant) in 10 ml of heptane is added dropwise over one hour to carry out deposition. The solid component thus obtained is separated from the solution and then washed with dehydrated heptane and dehydrated 1,2-dichloroethane.

Then, 50 ml of titanium tetrachloride [component (4)] and 50 ml of 1,2-dichloroethane are added to the solid component, and the resulting mixture is heated to 80° C. with stirring for 1.5 hours. The solid component thus obtained is separated from the solution. Again, 50 ml of titanium tetrachloride [component (4)] and 50 ml of 1,2-dichloroethane are added thereto, and the mixture is heated to 80° C. with stirring for 1.5 hours. The solid component thus obtained is separated from the solution and washed. The resulting solid component was found to contain 2.94% by weight of titanium and 18.5% by weight of magnesium.

Polymerization of propylene

A stainless steel autoclave of 1-liter capacity in which air had been replaced with propylene gas was charged with 500 ml of dehydrated industrial grade heptane, 248 mg of triisobutylaluminum, 103 mg of ethylaluminum sesquichloride, 41.4 mg of methyl p-toluylate, and 0.4 mg (as titanium atom) of the above described solid catalyst component. Propylene at a pressure of 1 $kg/cm^2G$ was then added. The mixture was subjected to prepolymerization at room temperature for 30 minutes, after which 200 ml (STP) of hydrogen was added. The reaction system was warmed to 70° C. and subjected to polymerization for 2 hours at a total pressure of 9 $kg/cm^2G$ of propylene.

As a result, 246.1 g of polypropylene (containing heptane-solubles) was obtained, of which the I.I. (percent extraction residue in boiling n-heptane) was 95.3% and the M.I. (melt index) was 2.6 g/10 minutes. The polymerization activity was 615,000 g-polymer/g-titanium atom, i.e., 18,100 g-polymer/g-solid catalyst component.

COMPARATIVE EXAMPLE 1

A solid component which was prepared and separated out by the addition of titanium tetrachloride (separating agent) as in Example 1 was separated from the solution, amply washed and then dried to obtain a yellow-green solid powder. The resulting solid contained 6.39% by weight of titanium and 12.4% by weight of magnesium, and had a specific surface area (by BET method) of 3.9 $m^3/g$. Under the same conditions as in Example 1, polymerization of propylene was carried out by using this solid powder as a catalyst. Only a trace amount of polypropylene was obtained.

COMPARATIVE EXAMPLE 2

A homogeneous solution which was obtained from heptane, $MgCl_2$ [component (1)], $Ti(O-nC_4H_9)_4$ [component (2)] and ethyl p-toluylate [component (3)] as in Example 1, was dropwisely added slowly over one hour into 100 ml of titanium tetrachloride (precipitant) cooled to $-20°$ C. to conduct deposition. The mixture was stirred at 40° C. for one hour to cause aging. As a result, the entire solution gelled. A portion of the solution was separated and washed with heptane to obtain a solid catalyst component containing 8.71% by weight of titanium.

Under the same conditions as in Example 1, polymerization of propylene was carried out by using the resulting solid as a catalyst, whereupon 17.5 g of polypropylene containing heptane-solubles was obtained. The polymerization activity was 44,000 g-polymer/g-titanium atom, i.e., 3,800 g-polymer/g-solid catalyst component.

EXAMPLE 2

A homogeneous solution obtained from industrial-grade heptane, $MgCl_2$ [component (1)], $Ti(O-nC_4H_9)_4$ [component (2)] and ethyl p-toluylate [component (3)] as in Example 1, was added dropwise over 1 hour into a mixed solution cooled to $-40°$ C. consisting of 3 ml of titanium tetrachloride (precipitant) and 100 ml of silicon tetrachloride (precipitant) to conduct deposition. Procedures for preparation of the solid catalyst component were carried out as in Example 1 except that the solid component was treated only once with a mixed solution of 50 ml of titanium tetrachloride [component (4)] and 50 ml of 1,2-dichloroethane. As a result, a solid catalyst component containing 4.00% by weight of titanium and 16.0% by weight of magnesium was obtained.

Under the same conditions as in Example 1, polymerization of propylene was carried out by using 0.4 mg (as titanium atom) of the resulting solid catalyst component and 170 ml of hydrogen. As a result, 162.8 g of polypropylene containing heptane-solubles was obtained, of which the I.I. was 92.9% and the M.I. was 2.9 g/10 minutes. The polymerization activity was 407,000 g-polymer/g-titanium atom, i.e., 16,300 g-polymer/g-solid catalyst component.

EXAMPLE 3

Preparation of a solid catalyst component was carried out as in Example 1 except that the solid component was separated out by adding dropwise a mixed solution used as a precipitant and consisting of 0.036 mol of titanium tetrachloride, 8.4 ml of silicon tetrachloride and 10 ml of heptane. As a result, a solid component containing 2.46% by weight of titanium and 18.1% by weight of magnesium was obtained.

Under the same conditions as in Example 1, polymerization of propylene was carried out by using 0.4 mg (as titanium atom) of the solid catalyst component and 215 mg of triisobutylaluminum. As a result, 261.7 g of polypropylene containing heptane-solubles was obtained, of which the I.I. was 96.4% and the M.I. was 1.6 g/10 minutes. The polymerization activity was 654,000 g-polymer/g-titanium atom, i.e., 16,100 g-polymer/g-solid catalyst component.

EXAMPLE 4

A 200 ml 3-necked flask is charged with 25 ml of industrial-grade heptane, 0.052 mol of $MgCl_2$ [component (1)] and 0.11 mol of $Ti(O-nC_4H_9)_4$ [component (2)], respectively. The mixture is heated to 80° C. and stirred to form a homogeneous solution. The resulting solution is cooled to room temperature, and then 0.0066 mol of ethyl benzoate [component (3)] is introduced thereinto.

A 300 ml 4-necked flask is charged with 35 ml of heptane and 0.066 mol of ethyl benzoate [component (3)]. To this solution under agitation, both the above described homogeneous solution and a mixed solution consisting of 0.11 mol of titanium tetrachloride(precipitant) and 10 ml of heptane are added dropwise at the same time. The resulting mixture is subjected to deposition of a solid component. The subsequent procedures are conducted as in Example 1. Thus, in an actual instance, a solid catalyst component containing 3.32% by weight of titanium and 17.1% by weight of magnesium was obtained.

Under the same conditions as in Example 1, polymerization of propylene was carried out by using 0.4 mg (as titanium atom) of the solid catalyst component and 215 mg of triisobutylaluminum. As a result, 181.9 g of polypropylene containing heptane-solubles was obtained, of which the I.I. was 96.2% and the M.I. was 2.8 g/10 minutes. The polymerization activity was 455,000 g-polymer/g-titanium atom, i.e., 15,100 g-polymer/g-solid catalyst component. A sieve analysis of the resulting polypropylene powder showed the following proportions by weight. It can be seen that the polypropylene has a very uniform distribution of particle sizes.

105$\mu$ or less: 3.7%
105 to 500$\mu$: 91.6%
500$\mu$ or greater: 4.7%

EXAMPLE 5

A solution of $MgCl_2$ is prepared in the same manner as in Example 4 except that the quantity of ethyl benzoate added is 0.01 mol. A 300-ml 4-necked flask is charged with 60 ml of heptane, and the temperature thereof is adjusted to 20° C. To the heptane under agitation, both the above mentioned homogeneous solution of $MgCl_2$ and a solution of 0.11 mol of titanium tetrachloride in 10 ml of heptane are dropwisely added over 1 hour at the same time to cause deposition of a solid component. The mixture is stirred at 20° C. for another hour, and then the solid component is separated from the solution and amply washed with heptane.

A portion of the solid is taken out and subjected to analysis, whereupon it is found that it contains 9.3% of Ti, 9.5% of Mg, and 9.9% of ethyl benzoate. To the solid component are added 80 ml of heptane and 40 ml of $TiCl_4$. The mixture is heated to 80° C. with stirring and maintained at 80° C. for 2 hours. While it is still hot, the solid is separated from the liquid and washed with heptane. Then, 20 ml of $TiCl_4$ is added thereto. The resulting mixture is heated to 80° C. and maintained at this temperature for 2 hours. The solid is again removed from the liquid and washed with heptane. This operation is repeated again by addition of 20 ml of $TiCl_4$. In one instance of practice, the solid catalyst component thus obtained was found to contain 3.55% of Ti, 19.0% of Mg and 13.8% of ethyl benzoate.

Polymerization of propylene using the solid catalyst component was carried out under the same conditions as in Example 1. As a result, 197.3 g of polypropylene containing solvent-solubles was obtained, of which the I.I. was 96.9%, the M.I. was 1.1 g/10 minutes, and the BD (bulk density) of the polymer was 0.41 g/ml. The proportion of fine powder of 105$\mu$ or smaller particle size was 2.9%.

EXAMPLE 6

A homogeneous solution consisting of 25 ml of toluene, 0.052 mol of $MgCl_2$, 0.11 mol of $Ti(O-nC_4H_9)_4$ and 0.0078 mol of ethyl benzoate is formed. A 300-ml 4-necked flask is charged with 60 ml of toluene. The toluene is adjusted to a temperature of 20° C. and agitated. The above mentioned homogeneous solution and a mixed solution consisting of 0.11 mol of $TiCl_4$ and 10 ml of toluene are both added dropwisely over 1 hour at the same time. When half of the homogeneous solution and mixed solution have been added, 0.0026 mol of ethyl benzoate is supplied to the $MgCl_2$ solution, and the dropwise addition is continued. After the addition, the agitation is continued for 1 hour. Then, the resulting solid is separated from the liquid and amply washed with toluene to obtain a separated-out solid. The separated solid is treated with $TiCl_4$ in the same manner as in Example 3. The solid catalyst component thus obtained in one instance of practice was found to contain 4.02% of Ti and 16.4% of Mg.

Polymerization of propylene using the solid catalyst component was carried out under the same conditions as in Example 1. As a result, 254.6 g of polypropylene containing solvent solubles was obtained, of which the I.I. was 96.3%, the M.I. was 2.3, and the BD was 0.43.

EXAMPLE 7

The procedures of Example 3 were repeated. However, after the separated solid was washed and before it was treated with $TiCl_4$, the solid was stirred at room temperature for 1 hour in a solution consisting of 80 ml of heptane and 0.6 g of triisobutylaluminum. The resulting catalyst contained 4.64% of titanium.

Polymerization of propylene using the solid catalyst was carried out under the same conditions as in Example 1. As a result, 123.1 g of polypropylene containing solvent-soluble polymers, of which the I.I. was 97.4%, the M.I. was 1.9 and the BD was 0.47, was obtained.

EXAMPLE 8

The procedures of Example 3 were repeated. However, after the treatment with TiCl4, the separated solid was once washed with heptane and then was stirred for 30 minutes in a solution consisting of 80 ml of heptane and 0.3 g of triisobutylaluminum, after which it was washed amply with heptane. The resulting catalyst contained 3.27% of titanium.

Polymerization of propylene with the use of the catalyst was carried out under the same conditions as in Example 1. As a result, 210.3 g of polypropylene containing solvent-soluble polymers, of which the I.I. was 97.2%, the M.I. was 2.2 and the BD was 0.44, was obtained.

EXAMPLE 9

A 300-ml 4-necked flask is charged with 25 ml of industrial grade heptane, 0.052 mol of MgCl2 [component (1)], 0.058 mol of Ti(O-nC4H9)4 [component (2)], 0.21 mol of epichlorohydrin [component (3)] and 0.016 mol of ethyl benzoate, respectively. The mixture is warmed to 60° C. and stirred to form a homogenerous solution. After it is cooled to room temperature, to the homogeneous solution is slowly added dropwisely over 1 hour a mixed solution consisting of 0.16 mol of titanium tetrachloride (precipitant) and 10 ml of heptane. The mixture is subjected to deposition. In one instance of practice, the subsequent procedures were conducted as in Example 1 to obtain a solid catalyst component containing 3.25% by weight of Ti and 19.6% by weight of Mg.

Polymerization of propylene was carried out as in Example 1 except that 0.4 mg (as Ti atom) of the solid catalyst component and 215 mg of triisobutylaluminum were used. As a result, 157.2 g of polypropylene containing heptane solubles, of which the I.I. was 95.3% and the M.I. was 3.2 g/10 minutes, was obtained. The polymerization activity was 393,000 g-polymer/g-titanium atom, i.e., 12,800 g-polymer/g-solid catalyst component.

What is claimed is:

1. A component of a catalyst for polymerization of olefins which component is a contact product of:
   a component A which is a solid product obtained by mixing a solution of components (1) and (2) and 0.05 to 5 mols of a precipitant which comprises titanium tetrachloride per mol of the component (1) in the copresence of a component (3) thereby to produce a solid product and washing the solid product with an aprotic organic solvent selected from the group consisting of hydrocarbons and halohydrocarbons to remove a soluble titanium component,
   the component (1) being a magnesium compound represented by the formula $Mg(OR^1)_{2-n}X_n$, wherein $R^1$ is a hydrocarbyl having 1 to 12 carbon atoms, which is an alkyl, an aryl, an aralkyl or a cycloalkyl, or a haloderivative thereof; X is a halogen; and n is a number satisfying $0<n\leqq 2$,
   the component (2) being a titanium component represented by the formula $Ti(OR^2)_4$ or a polymer thereof, wherein $R^2$ is a hydrocarbyl having 1 to 12 carbon atoms, which is an alkyl, an aryl, an aralkyl or a cycloalkyl, or a halo-derivative thereof, $R_2$ being the same as or different from $R^1$,
   the component (3) being an electon-donor compound, and
   a compound B which is titanium tetrachloride.

2. The catalyst component according to claim 1, in which the precipitant is in a state wherein it has been diluted with silicone tetrachloride or/and stannous tetrachloride.

3. A method for preparing a component of a catalyst for polymerization of olefins, which method comprises contacting:
   a component A which is a solid product obtained by mixing a solution of components (1) and (2) and 0.05 to 5 mols of a precipitant which comprises titanium tetrachloride per mol of the component (1) in the copresence of a component (3) thereby to produce a solid product and washing the solid product with an aprotic organic solvent selected from the group consisting of hydrocarbons and halohydrocarbons to remove a soluble titanium component,
   the component (1) being a magnesium compound represented by the formula $Mg(OR^1)_{2-n}X_n$, wherein $R^1$ is a hydrocarbyl having 1 to 12 carbon atoms, which is an alkyl, an aryl, an aralkyl or a cycloalkyl, or a haloderivative thereof; X is a halogen; and n is a number satisfying $0<n\Psi 2$,
   the component (2) being a titanium component represented by the formula $Ti(OR^2)_4$ or a polymer thereof, wherein $R^2$ is a hydrocarbyl having 1 to 12 carbon atoms, which is an alkyl, an aryl, an aralkyl or a cycloalkyl, or a halo-derivative thereof, $R_2$ being the same as or different from $R^1$,
   the component (3) being an electron-donor compound, and
   a compound B which is titanium tetrachloride.

4. The method according to claim 3, in which (i) a solution comprising the components (1), (2) and (3), and (ii) titanium tetrachloride as the precipitant are added dropwise at the same time into an organic solvent, thereby to produce the solid product which is then to be washed.

5. The method according to claim 3, in which (i) a solution comprising the components (1) and (2), (ii) the component (3) and (iii) titanium tetrachloride as the precipitant are added dropwise at the same time into an organic solvent, thereby to produce the solid product which is then to be washed.

6. The method according to claim 3, in which (i) a solution comprising the components (1) and (2) and optionally the component (3), and (ii) titanium tetrachloride as the precipitant are added dropwise at the same time into an organic solvent containing the component (3),thereby to produce the solid product which is then to be washed.

7. The method according to claim 6, in which the component (3) is supplemented to the solution to be added in the course of the dropwise addition.

8. The method according to any of claims 3 through 7, in which the amounts to be used in a molar ratio per part of the component (1) are:
   the component (2): 0.1 to 10 parts
   the component (3): 0.01 to 40 parts
   the precipitant: 0.05 to 5 parts and
   the component (B): 0.1 to 100 parts.

9. The method according to any of claims 3 through 7, in which the amounts to be used in a molar ratio per part of the component (1) are:
   the component (2): 0.2 to 3 parts
   the component (3): 0.1 to 8 parts
   the precipitant: 0.1 to 4 parts and
   the component (B): 2 to 40 parts.

10. The method according to claim 3, in which the treatment of contacting the component (B) with the component (A) and the operation of washing the solid product with an aprotic organic solvent are conducted at least twice.

* * * * *